April 15, 1947.  G. N. COLE ET AL  2,418,868
ENGINE SHIPPING CASE
Filed April 26, 1944  2 Sheets-Sheet 1
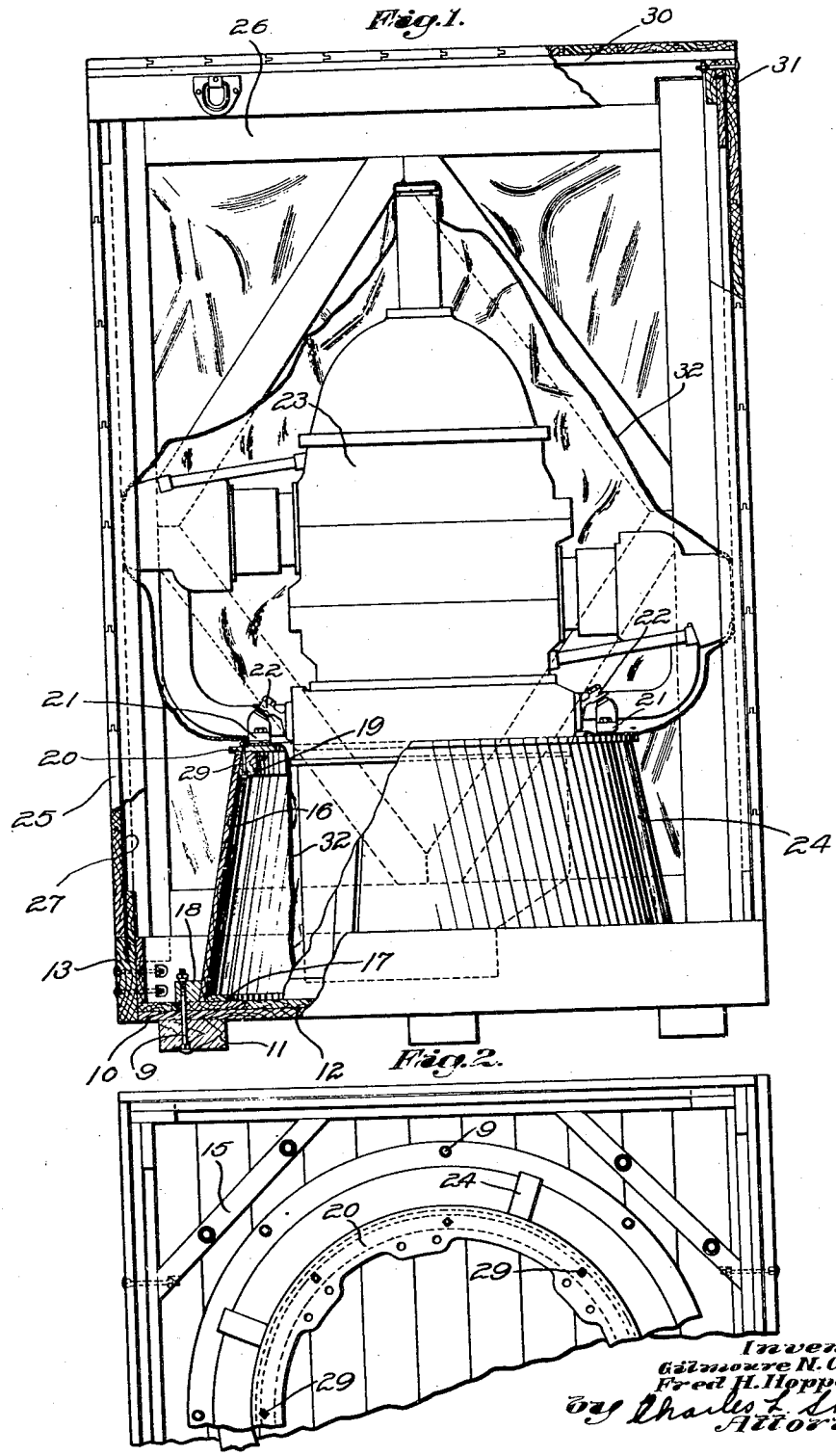

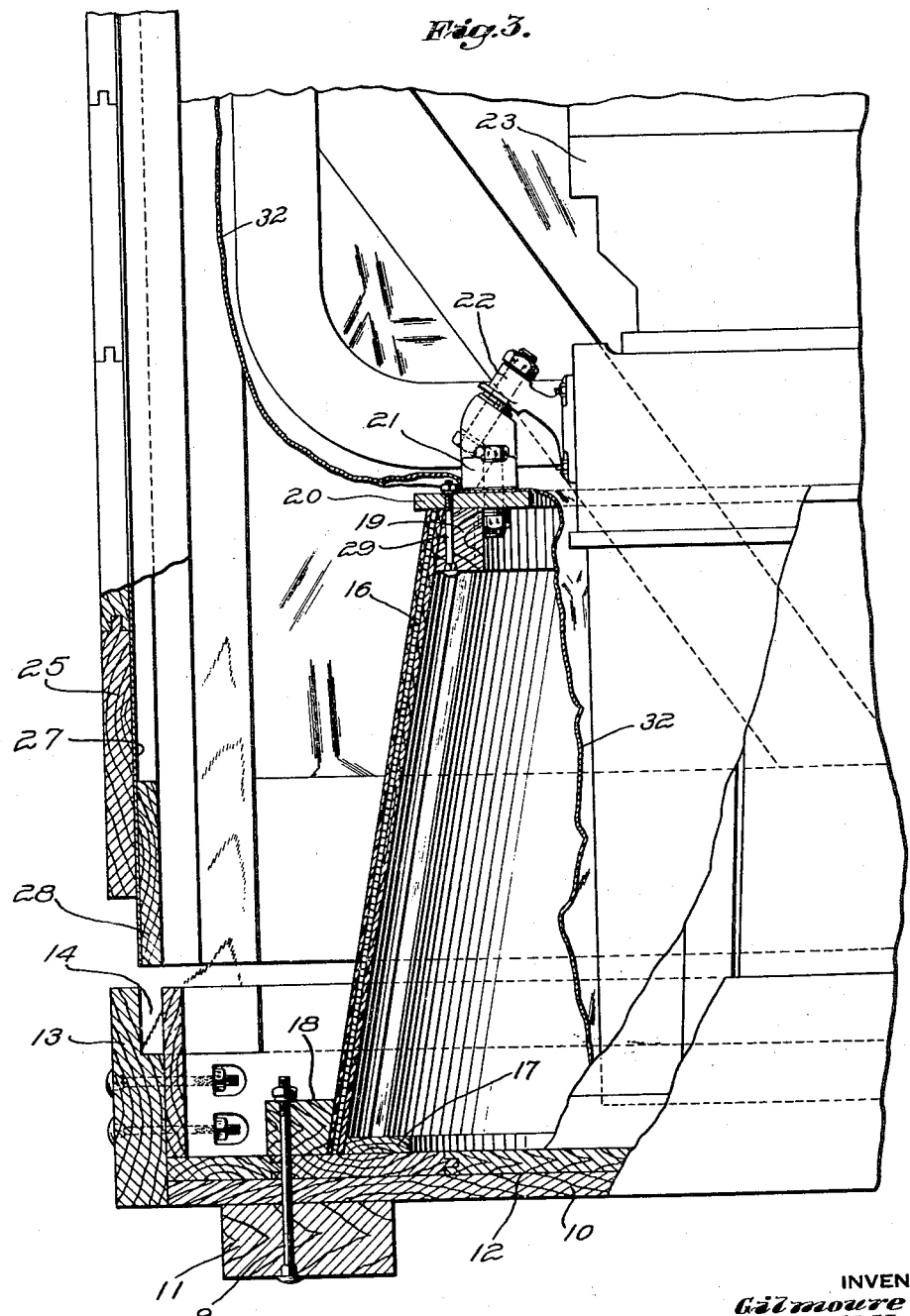

Patented Apr. 15, 1947

2,418,868

UNITED STATES PATENT OFFICE 2,418,868

ENGINE SHIPPING CASE

Gilmoure N. Cole and Fred H. Hopper, Manchester, Conn., assignors to United Aircraft Corporation, East Hartford, Conn., a corporation of Delaware Application April 26, 1944, Serial No. 532,700

3 Claims. (Cl. 206—46)

This invention relates to packing and shipping cases and particularly to a demountable or knockdown container for packing, storing, and shipping aircraft engines by freight, truck, or air.

More particularly, the invention relates to an improved packing and shipping case or container enabling an aircraft engine, or other type of engine or machine, to be packed and shipped in a dust and moisture-proof manner, the case being strong enough to support the engine or machine rigidly in position and protect it from injury and there being a flexible dust and moisture-proof enclosure within the case for the engine or other part being shipped. The case also is adapted to be easily disassembled into members requiring minimum packing space for return shipment after the engine or machine has been removed.

A primary object of the invention is to provide an efficient, inexpensive, and adaptable shipping and packing case particularly designed for aircraft engines enabling the engine to be mounted within the case on a central vertical axis and maintained therein by means of its mounting brackets such as those used in securing the engine to the fuselage of an aircraft, there being adapter brackets attached to the engine mounting brackets for mounting the engine or machine on a supporting ring.

A feature that enables the above object to be accomplished is that the casing includes a frustum centrally disposed within the case and supported on the base thereof with its axis extending vertically and centrally of the casing, on the upper surface of the frustum there being mounted the adapter plate or ring of metal to which the adapter brackets are detachably mounted.

Another object of the invention is to enable a flexible dust and moisture-proof envelope to be provided within the casing enclosing the engine and with the envelope extending between the ring and the adapter brackets so that the engine will be entirely enclosed within its moisture-proof enclosure.

Another object of the invention is to detachably attach the frustum to the base so that the engine, or other object being shipped, may be removed from the case with the frustum and mounting ring for temporary storage or for shipment by air.

A still further object of the invention is to provide side panels and a top member for the case, the side panels being demountably attached to a base member and to each other and the top member being demountably attached to the side panels so that with the base member a complete enclosure is provided for the engine.

Other objects and advantages will be apparent from the specification and claims and from the drawings which illustrate what is now considered to be a preferred embodiment of the invention.

In the drawings,

Fig. 1 is a front elevation of a complete packing and shipping case made in accordance with the present invention, one of the side panels of which has been removed, and some of the parts being shown in section.

Fig. 2 is a plan view of a portion of the case with the cover member removed, and Fig. 3 is an enlarged view of a portion of Fig. 1 to show details of construction.

In its preferred form the invention may include the following principal parts: First, a base or platform having centrally mounted thereon the frustum of a cone secured in fixed position upon the upper surface of the base; second, an adapter plate or ring preferably of metal detachably secured to the upper surface of the frustum; third, side panels for the case fitting within grooves or slots formed at the peripheral portions of the base; fourth, a cover or top member having a groove extending about its periphery into which may enter the upper ends of the side panels; and fifth, adapter brackets attached to the mounting brackets on the engine enabling the engine to be secured in position upon the adapter plate at the upper end of the frustum.

Referring more in detail to the figures of the drawing, it will be seen that the case comprises a base or bottom section 10 made up of wood, there probably being three or more heavy cross pieces 11 below the main flooring preferably of matched floor boards to which the cross pieces are secured. The flooring may comprise two layers of matched boards laid at right angles to each other. Preferably and to aid in rendering the case dust and moisture proof, a sheet of impervious water-proof fiber or paper 12 may be provided between the layers of the floor boards 10. This base section may also have side walls 13 directly secured thereto and bolted to each other as shown in the drawings. These side walls preferably comprise several layers of boards forming at their upper edge a groove or recess 14 extending completely about the base.

The side walls 13 of the base each comprise on each side of the case an outer and an inner board, the outer boards at their upper ends being recessed as shown in Fig. 3 to provide the intermediate channel or recess extending around the base member 10. Suitable corner bracing members 15 to make the base 10 more rigid may be provided suitably secured as by bolts to the side walls 13 at their opposite ends and also to the base 10.

Also mounted on this base member 10 and preferably centrally disposed thereon is the conical or frustum member 16. The base of this member 16 is secured between inner and outer bracing rings 17 and 18, the outer one being secured to the segments forming the frustum as by nailing and gluing. At the upper edge of the frustum 16 is an annular reenforcing member 19 preferably disposed within the periphery of the frustum and secured to the frustum in the same manner as the member 18. On the upper surface of this conical or frustum member 16 is an adapter plate or ring 20 preferably of metal and having suitable attaching means for adapter brackets 21 or other mounting members to engage the mounting brackets 22 forming parts of the engine 23.

Preferably, and as shown in the figures of the drawings, the conical or frustum member 16 is made up of plywood, there preferably being three layers of equal thickness bonded together by a suitable, flexible, but water-proof adhesive. Also as shown, this conical or frustum member 16 is made up of a plurality of segments curved so that when all portions are secured together, they form a portion of a cone of circular cross section. To retain these sections in proper relative position, batten strips 24 are provided covering the joints between the sections, these strips 24 preferably being provided on the outer and inner surfaces of the cone and bonded thereto as by nailing and gluing.

The wall panels 25 comprise preferably a single layer of matched boards secured to an open wooden reenforcing framework 26, there also being water-proof fibrous paper or other material 27 covering the entire inner surface of these panels. Each side panel has a tongue 28 at its lower end formed by an extension of one of the frame members and adapted to enter the groove or recess on a side of the base member 10.

Enclosing the upper end of the casing is a top or cover member 30, this member having short depending side walls 31 thereon having annular grooves extending about their periphery in the same manner as the base, thus enabling tongues at the upper ends of the side panels to enter the grooves and thus secure the top member rigidly to the side members.

When the engine 23 has been mounted in position on the central frustum 16 and the side walls 25 and cover member 30 mounted in position upon the base 10, the assembled case may be rigidly held together by steel straps or bands completely encircling the case horizontally and vertically, preferably two or more of these being provided for each case and extending in each direction. To lift the assembled case and engine, sling ropes may be passed under the base 10 between the heavy cross pieces 11 or by any other suitable means.

As shown most clearly in Fig. 3 of the drawings, the engine 23, which is of the radial type, is provided with outstanding mounting brackets 22 secured to an intermediate portion of the engine such as the auxiliaries or blower section. These brackets 22 at their outer ends have oblique openings therethrough enabling the engine, when mounted in a plane, to be rigidly secured to a mounting ring or to bulkhead brackets provided on the fuselage of the plane mounting the engine. Through these holes in brackets 22, when the engine is being shipped, extend bolts or other fastening members for the adapter brackets 21, one adapter bracket being employed for each of the engine mounting brackets 22. These adapter brackets 21 have their lower ends, as shown in Fig. 3, extending in a common plane and may be directly attached to the annular metal ring 20 at the upper end of the frustum 16 by suitable bolts.

In mounting an engine within this packing and shipping case, the engine, with its adapter brackets 21 in place, is first enclosed within its flexible water-proof envelope 32 and the metal ring 20 is then positioned against the adapter brackets and made fast thereto. The "Pliofilm" or other flexible water-proof envelope 32 extends between the outer surfaces of the adapter brackets 21 and the upper surface of the ring 20. With the ring 20 thus mounted on the engine and on the outside of the flexible envelope 32, the complete engine with its envelope and mounting ring is lowered into the position shown in Fig. 1 in which the engine axis is aligned with the axis of the frustum. The plate or ring 20 is then made fast to the upper surface of the conical frustum preferably by means of bolts 29 extending through the reenforcing ring 19 for the upper end of the frustum 16. As shown, the ring 20 fits over the threaded upper ends of these bolts after which nuts may be threaded on the bolts to secure the ring 20 in position on the frustum 16.

By removing the nuts from bolts 9, the engine 23, with the plate 20 and frustum 16, may be separated from the remainder of the case so that, with minimum weight, the engine supported on the frustum 16 may be stored temporarily or shipped by air.

It is to be understood that the invention is not limited to the specific embodiment herein illustrated and described, but may be used in other ways without departure from the spirit of the invention as defined by the following claims.

We claim:

1. In an engine shipping case having a base and a cover therefor, a hollow frame for supporting an engine on the base independently of the cover, attaching means for securing an engine to one end of said frame with a portion of the engine projected within said frame, and attaching means including a framework carried by said frame substantially enclosing the lower portion of said frame adapted to be rigidly secured to said base for attaching the other end of said frame to said base and for preventing displacement of said frame with respect to said base, said frame and attaching means being removable with the engine as a unitary assembly for storage or shipment separately from the base and cover.

2. In an engine shipping case having a base and a cover therefor, a truncated tapered cradle for supporting an engine on the base independently of the cover, attaching means for securing an engine to the upper end of said cradle with a portion of the engine projected within said cradle, and attaching means including a circumferentially extending framework carried by and substantially enclosing the lower end of said cradle adapted to be rigidly secured to said base for attaching the cradle to said base and for preventing displacement of said cradle with respect to said base, said cradle and attaching means being removable with the engine as a unitary assembly for storage or shipment separately from the base and cover.

3. In an engine shipping case having a base and a cover therefore, a frusto-conical plywood housing for supporting an engine on the base independently of the cover, attaching means for securing an engine to one end of said housing with a portion of the engine projected within said housing, and attaching means including an annular framework carried by and enclosing the lower portion of said housing adapted to be rigidly secured to said base for attaching the other end of said housing to said base and for preventing displacement of said housing with respect to said base, said housing and attaching means being removable with the engine as a unitary assembly for storage or shipment separately from the base and cover.

GILMOURE N. COLE.
FRED H. HOPPER.

REFERENCES CITED

The following references are of record in the file of this patent:

UNITED STATES PATENTS

| Number | Name | Date |
|---|---|---|
| 2,341,801 | Miller | Feb. 15, 1944 |
| 2,300,259 | Kueppers | Oct. 27, 1942 |
| 410,811 | Stevens | Sept. 10, 1889 |
| 2,317,500 | Tyler | Apr. 27, 1943 |
| 2,071,300 | Gammeter | Feb. 16, 1937 |
| 2,156,357 | Simpson | May 2, 1939 |

FOREIGN PATENTS

| Number | Country | Date |
|---|---|---|
| 849,261 | France | Aug. 11, 1939 |

OTHER REFERENCES

Packaging Catalog 1943. (Rec'd in Library of U. S. Patent Office July 17, 1943.) Pages 149, 150 and 473. (Copy in Div. 40.)